US012246535B2

(12) United States Patent
Chida et al.

(10) Patent No.: US 12,246,535 B2
(45) Date of Patent: Mar. 11, 2025

(54) LIQUID EJECTION HEAD AND PRODUCTION METHOD FOR PRODUCING SAME

(71) Applicant: CANON KABUSHIKI KAISHA, Tokyo (JP)

(72) Inventors: Mitsuru Chida, Kanagawa (JP); Junichiro Iri, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 118 days.

(21) Appl. No.: 17/961,839

(22) Filed: Oct. 7, 2022

(65) Prior Publication Data

US 2023/0121567 A1 Apr. 20, 2023

(30) Foreign Application Priority Data

Oct. 14, 2021 (JP) ................................. 2021-168778

(51) Int. Cl.
*B41J 2/14* (2006.01)

(52) U.S. Cl.
CPC .............. *B41J 2/14072* (2013.01); *B41J 2/14* (2013.01); *B41J 2002/14491* (2013.01); *B41J 2202/18* (2013.01)

(58) Field of Classification Search
CPC ...................... B41J 2/14072; B41J 2/14; B41J 2002/14491; B41J 2202/18
See application file for complete search history.

(56) References Cited

U.S. PATENT DOCUMENTS 7,547,094 B2 * 6/2009 Kawamura .......... B41J 2/14024 347/50

FOREIGN PATENT DOCUMENTS

JP 2007-055221 A 3/2007

* cited by examiner

*Primary Examiner* — Geoffrey S Mruk
(74) *Attorney, Agent, or Firm* — Venable LLP

(57) ABSTRACT

A liquid ejection head includes an element substrate in which a liquid ejection port is formed, the element substrate having an energy generating element that generates energy for ejecting the liquid from the ejection port, and a plurality of wiring pads lined up in a predetermined direction; a flexible wiring substrate having a plurality of leads lined up in the predetermined direction and overlaid on and connected to the plurality of wiring pads, respectively, and a base film overlaid on the plurality of leads; and a sealant that seals a plurality of connection portions of the plurality of wiring pads and the plurality of leads. The base film has a plurality of covering portions that respectively cover an opposite side of the plurality of leads from the plurality of connection portions, and an opening or slit formed between the plurality of covering portions.

16 Claims, 11 Drawing Sheets

LIQUID EJECTION HEAD AND PRODUCTION METHOD FOR PRODUCING SAME

BACKGROUND OF THE INVENTION

Field of the Invention

The present invention relates to a liquid ejection head that ejects a liquid, and to a method for producing the same.

Description of the Related Art

Liquid ejection heads that eject a liquid ordinarily have an element substrate and a housing. The element substrate has a liquid ejection port formed therein. The element substrate further has at least a pressure chamber communicating with the ejection port, and an energy generating element that generates energy for ejecting the liquid from the ejection port. The housing is a liquid supply member that supplies liquid to the pressure chamber of the element substrate.

The liquid ejection head is used, for instance, in a liquid recording device, such as a print head (inkjet recording head) of an inkjet printer, in which a liquid (ink) is ejected onto, and recorded on, a recording medium such as paper. When the liquid recording device sends an electrical signal to the liquid ejection head, the energy generating element generates energy according to the electrical signal, and the liquid is ejected from the ejection port.

With an electrical signal being sent from the liquid recording device to the liquid ejection head, the element substrate and electrical output terminals of the liquid recording device are connected to each other by a flexible wiring substrate. Ordinarily, leads exposed from the wiring substrate are connected to wiring pads of the element substrate, and the exposed leads and the wiring pads are sealed (protected) with a sealant. Such a method requires, however, a large amount of sealant, since a wide area that encompasses the leads and the wiring pads is to be sealed (the electrical reliability of connection portions of the element substrate and the wiring substrate cannot be ensured with a small amount of sealant). The height (position) of the surface of the sealant in the thickness direction of the element substrate affects the precision of liquid ejection (affects the quality of the recorded image in a case where an image is recorded (printed) on the recording medium using a liquid). The materials used as the sealant in the above method are restricted for the purpose of achieving an appropriate value of the height of the surface of the sealant.

Japanese Patent Application Publication No. 2007-55221 discloses a method for forming bonding holes in a wiring substrate, separately from a device hole in which an ejection port is exposed. The bonding holes are formed in a portion facing connection portions between the element substrate and the wiring substrate. The method disclosed in Japanese Patent Application Publication No. 2007-55221 allows improving the selectivity of a sealing method (protection method) of connection portions of an element substrate and a wiring substrate, and selectivity of materials to be used in the sealant.

SUMMARY OF THE INVENTION

However, also in the method disclosed in Japanese Patent Application Publication No. 2007-55221, a wide area has to be sealed with a sealant, and thus a large amount of sealant is required. In addition, exposed leads have to be sealed in the bonding holes with a sealant, and thus the electrical reliability of the connection portions between the element substrate and the wiring substrate are not necessarily ensured through sealing with reduced height.

It is an object of the present invention to provide a liquid ejection head in which connection portions between an element substrate and a wiring substrate are sufficiently sealed with a small amount of a sealant, and to provide a method for producing the liquid ejection head.

The liquid ejection head of the present invention includes:

an element substrate in which a liquid ejection port is formed, the element substrate having an energy generating element that generates energy for ejecting the liquid from the ejection port, and a plurality of wiring pads lined up in a predetermined direction:

a flexible wiring substrate having a plurality of leads lined up in the predetermined direction and overlaid on and connected to respectively the plurality of wiring pads, and a base film overlaid on the plurality of leads; and a sealant that seals a plurality of connection portions of the plurality of wiring pads and the plurality of leads, wherein the base film has:

a plurality of covering portions that respectively cover an opposite side of the plurality of leads from the plurality of connection portions; and an opening or slit formed between the plurality of covering portions.

The method for producing a liquid ejection head of the present invention includes the following steps:

- preparing an element substrate in which a liquid ejection port is formed, the element substrate having an energy generating element that generates energy for ejecting the liquid from the ejection port, and a plurality of wiring pads lined up in a predetermined direction;
- preparing a flexible wiring substrate having a plurality of leads lined up in the predetermined direction and overlaid on and connected to respectively the plurality of wiring pads, and a base film overlaid on the plurality of leads;
- respectively connecting the plurality of leads to the plurality of wiring pads; and
- sealing, by a sealant, a plurality of connection portions of the plurality of wiring pads and the plurality of leads, wherein the base film has:

- a plurality of covering portions that respectively cover an opposite side of the plurality of leads from the plurality of connection portions; and
- an opening or slit formed between the plurality of covering portions.

The present invention allows providing a liquid ejection head in which connection portions between an element substrate and a wiring substrate are sufficiently sealed with a small amount of a sealant, and allows providing a method for producing that liquid ejection head.

Further features of the present invention will become apparent from the following description of exemplary embodiments with reference to the attached drawings.

DESCRIPTION OF THE EMBODIMENTS

Figure 1:
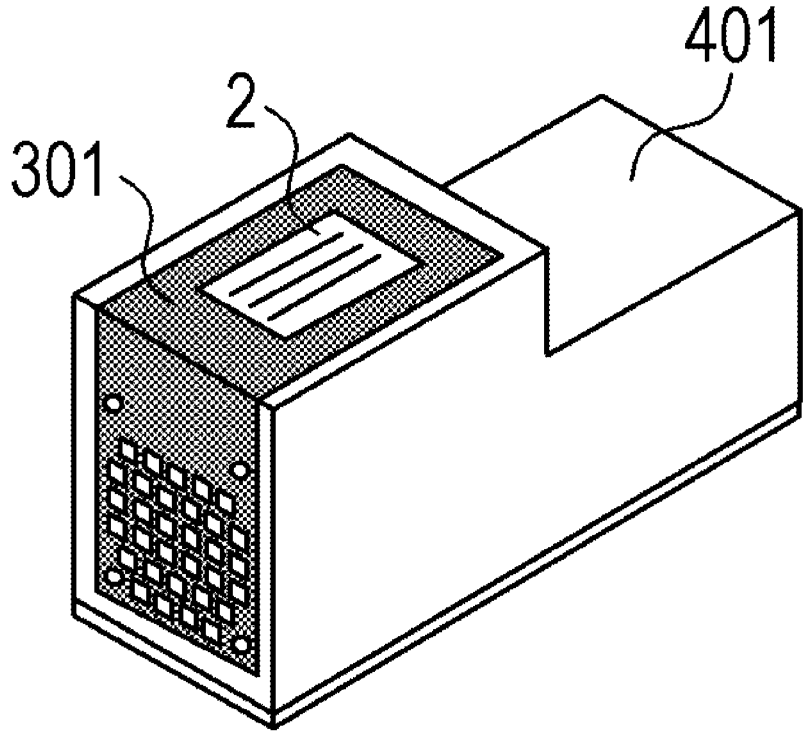
FIG. 1 is a perspective-view of a liquid ejection head according to an embodiment of the present invention.

Embodiments of the present invention will be explained hereafter with reference to accompanying drawings. FIG. 1 is a perspective view of a liquid ejection head according to the present embodiment. As FIG. 1 illustrates, the liquid ejection head has a configuration in which an element substrate 2 and a flexible wiring substrate 301 are mounted on a housing 401 which is a liquid supply member. Although explained in detail below, a liquid ejection port is formed in the element substrate 2; the element substrate 2 has an energy generating element that generates energy for ejecting a liquid from the ejection port, and multiple wiring pads lined up in a predetermined direction. The wiring substrate 301 has a plurality of leads lined up in a predetermined direction and overlaid on and connected to respectively the plurality of wiring pads of the element substrate 2, and a base film overlaid on the plurality of leads. Connection portions between the plurality of wiring pads of the element substrate 2 and the plurality of leads of the wiring substrate 301 are sealed with a sealant. The liquid ejection head is used in a liquid recording device such as a print head (inkjet recording head) of an inkjet printer, in which recording is accomplished through ejection of a liquid (ink) onto a recording medium such as paper.

COMPARATIVE EXAMPLE

Figure 11:
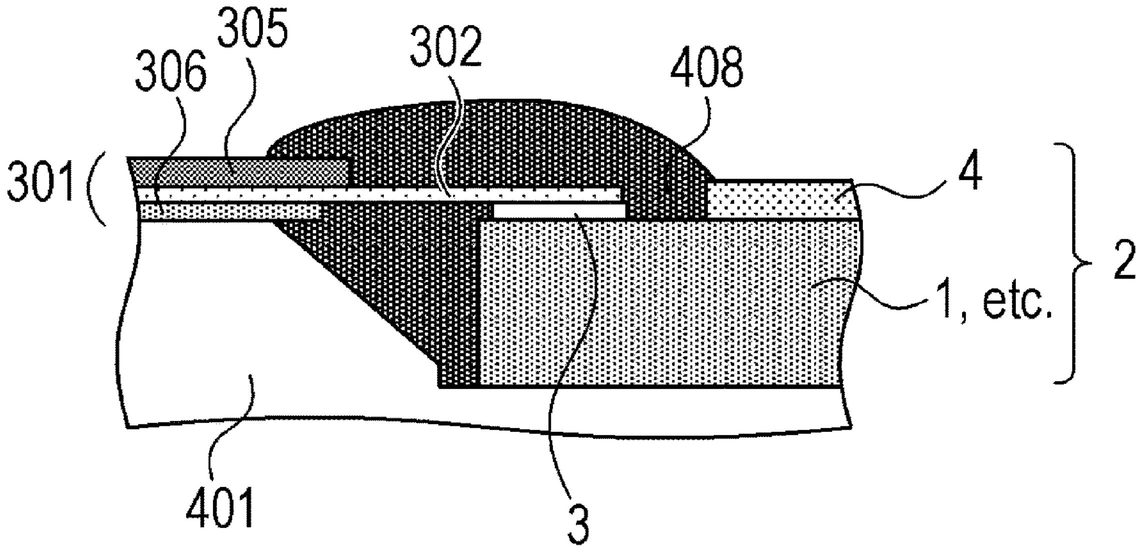
FIG. 11 is a cross-sectional view of a liquid ejection head according to a comparative example.

FIG. 11 is a cross-sectional view of a liquid ejection head according to a comparative example. A perspective view of the liquid ejection head according to the comparative example is substantially similar to that of FIG. 1. FIG. 11 is a cross-sectional view of a connection portion between a wiring pad 3 of the element substrate 2 and a lead 302 of the wiring substrate 301, as viewed from a direction parallel to the element substrate 2. In the liquid ejection head of FIG. 11, leads 302 exposed from the wiring substrate 301 are connected to the wiring pads 3 of the element substrate 2, and the exposed leads 302 and the wiring pads 3 are sealed (protected) by a sealant 408 (underfill agent). To produce the liquid ejection head of FIG. 11, a wide area including the leads 302 and the wiring pads 3 is to be sealed by the sealant 408, and, accordingly, a large amount of sealant 408 is required (the electrical reliability of the connection portions between the element substrate 2 and the wiring substrate 301 cannot be ensured with a small amount of sealant 408). Further, the height (position) of the surface of the sealant

408 in the thickness direction of the element substrate 2 influences the liquid ejection precision (influences the quality of the recorded image in a case where an image is recorded (printed) on the recording medium using a liquid). In the production of the liquid ejection head of FIG. 11 the materials used in the sealant 408 are restricted, with a view to imparting an appropriate value to the height of the surface of the sealant 408.

Embodiment 1

Figure 2A:
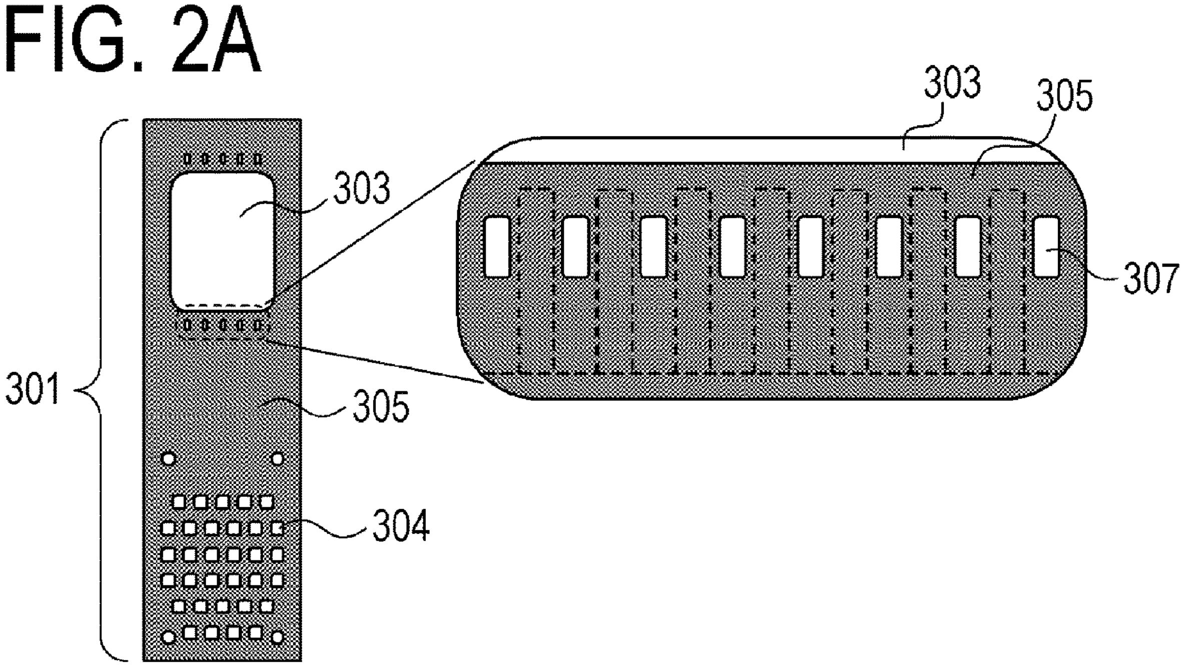
FIGS. 2A and 2B are external views of a wiring substrate according to Embodiment 1.
Figure 2B:
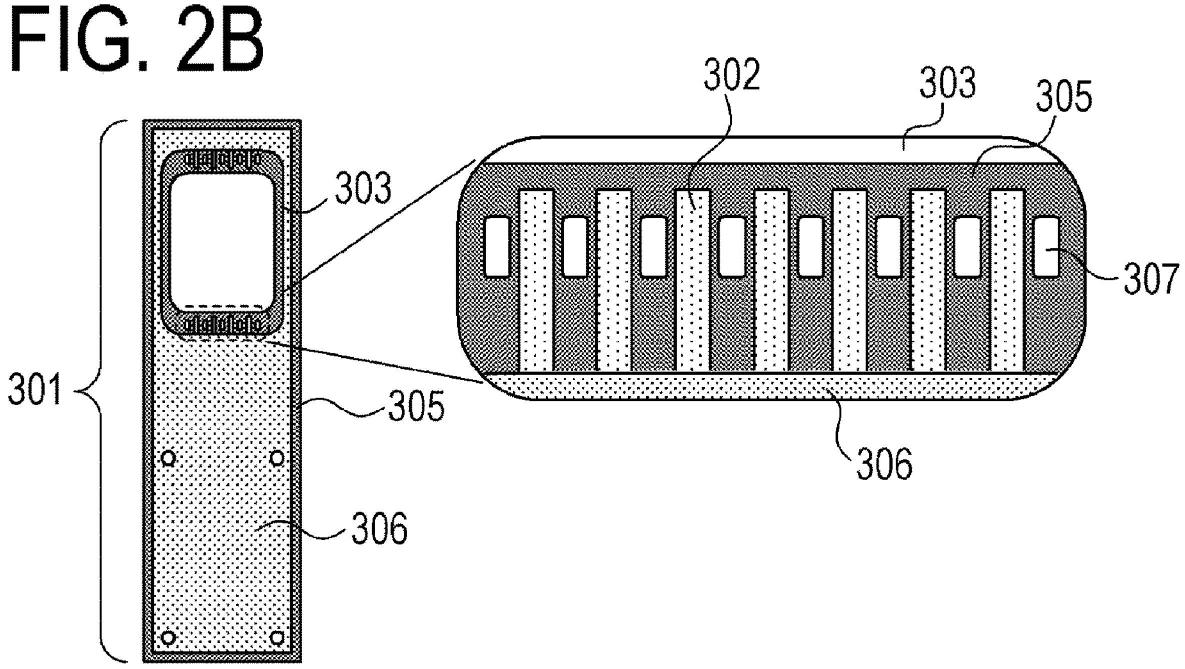

FIG. 2A and FIG. 2B are external views of the wiring substrate 301 according to Embodiment 1. The wiring substrate 301 according to Embodiment 1 has a configuration in which a plurality of leads 302 (inner leads) are sandwiched between the base film 305 and the cover film 306. FIG. 2A is an external view as viewed from the base film 305, and FIG. 2B is an external view as viewed from the cover film 306. For instance, the leads 302 are wiring lines resulting from plating of copper foil with nickel and gold. An insulating resin such as Upilex®, Kapton® or Mictron™ can be used as the material of the base film 305. The same is true of the material of the cover film 306.

A device hole 303 (opening) at which the ejection port of the element substrate 2 is exposed is formed in the wiring substrate 301. Around the device hole 303, the leads 302 are connected to respective wiring pads of the element substrate 2, so that the base film 305 is positioned outward of the cover film 306 in the liquid ejection head. In the periphery of the device hole 303, the cover film 306 is not present, and one side (side connected to the wiring pads) of each lead 302 is exposed, while the other side (reverse side from that connected to the wiring pads) is covered by the base film 305. As described above, the base film 305 has a plurality of covering portions respectively covering the plurality of leads 302, on the reverse side from that of the plurality of connection portions with the plurality of wiring pads.

The base film 305 is provided with a plurality of contact pads 304 that come into contact with electrical output terminals of the liquid recording device, such that the leads 302 pass between the base film 305 and the cover film 306 and are connected to the plurality of contact pads 304.

At the peripheral portion of the leads 302 (portion at which neither the leads 302 nor the cover film 306 is provided), through-holes 307 (openings) for injection (inflow of the sealant 408) are formed, independently from the device hole 303, in the base film 305. The leads 302 and the through-holes 307 are alternately juxtaposed in a predetermined direction in which the leads 302 are lined up. As described above, the base film 305 has through-holes 307 formed between the plurality of covering portions. The size (width) of the through-holes 307 in the predetermined direction is smaller than the spacing between the plurality of leads 302, so that the leads 302 are not exposed in a state where the wiring substrate 301 is connected to the element substrate 2. The size of the through-holes 307 in the predetermined direction may be set to be smaller than the spacing of the plurality of wiring pads of the element substrate 2, so as to prevent the wiring pads of the element substrate 2 from becoming exposed in a state where the wiring substrate 301 is connected to the element substrate 2.

Figure 3A:
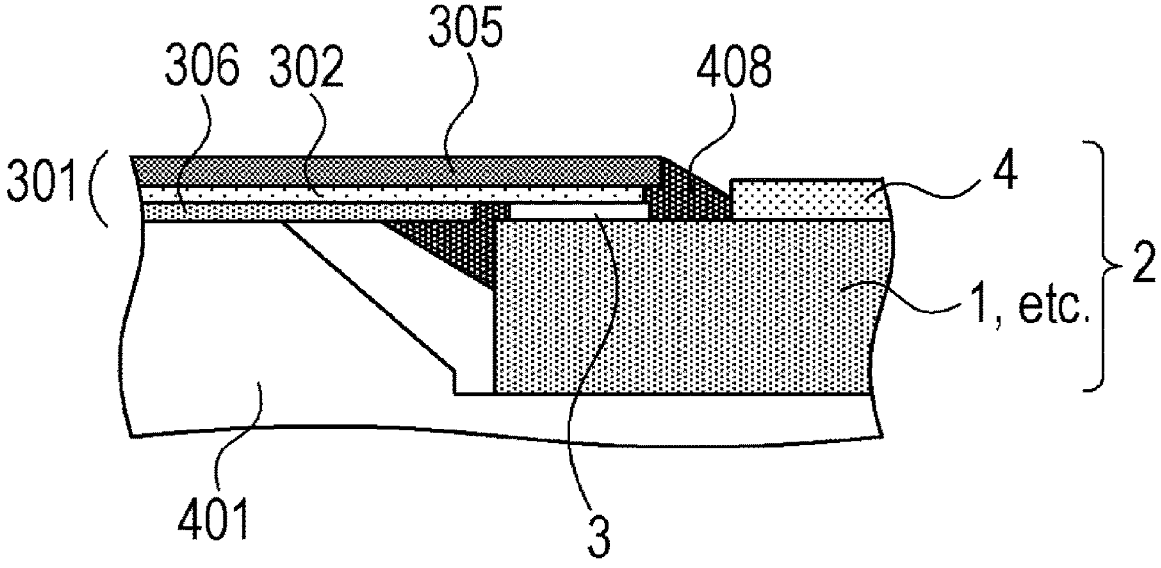
FIGS. 3A and 3B are cross-sectional views of a liquid ejection head according to Embodiments 1 and 2.

FIG. 3A is a cross-sectional view of the liquid ejection head according to Embodiment 1 (cross-sectional view of a connection portion between a wiring pad 3 of the element substrate 2 and a lead 302 of the wiring substrate 301, as viewed from a direction parallel to the element substrate 2). In the liquid ejection head according to Embodiment 1, the leads 302 (on the reverse side from that of the connection portions with the wiring pads 3) are covered with the base film 305. Accordingly, it is not necessary to seal the leads 302 with the sealant 408, and the connection portions between the element substrate 2 and the wiring substrate 301 can be sufficiently sealed with a small amount of the sealant 408. In the liquid ejection head according to Embodiment 1, moreover, through-holes 307 are formed in the base film 305 between mutually adjacent leads 302. The sealant 408 is injected via the through-holes 307. It becomes therefore possible to improve the selectivity of the sealing method (protection method) of the connection portions between the element substrate 2 and the wiring substrate 301, and the selectivity of the material used in the sealant 408. As a result, the height of the surface of the sealant 408 can be curtailed, and liquid ejection precision can be improved (improved quality of the recorded image in a case where an image is recorded (printed) on the recording medium using a liquid).

Figure 4:
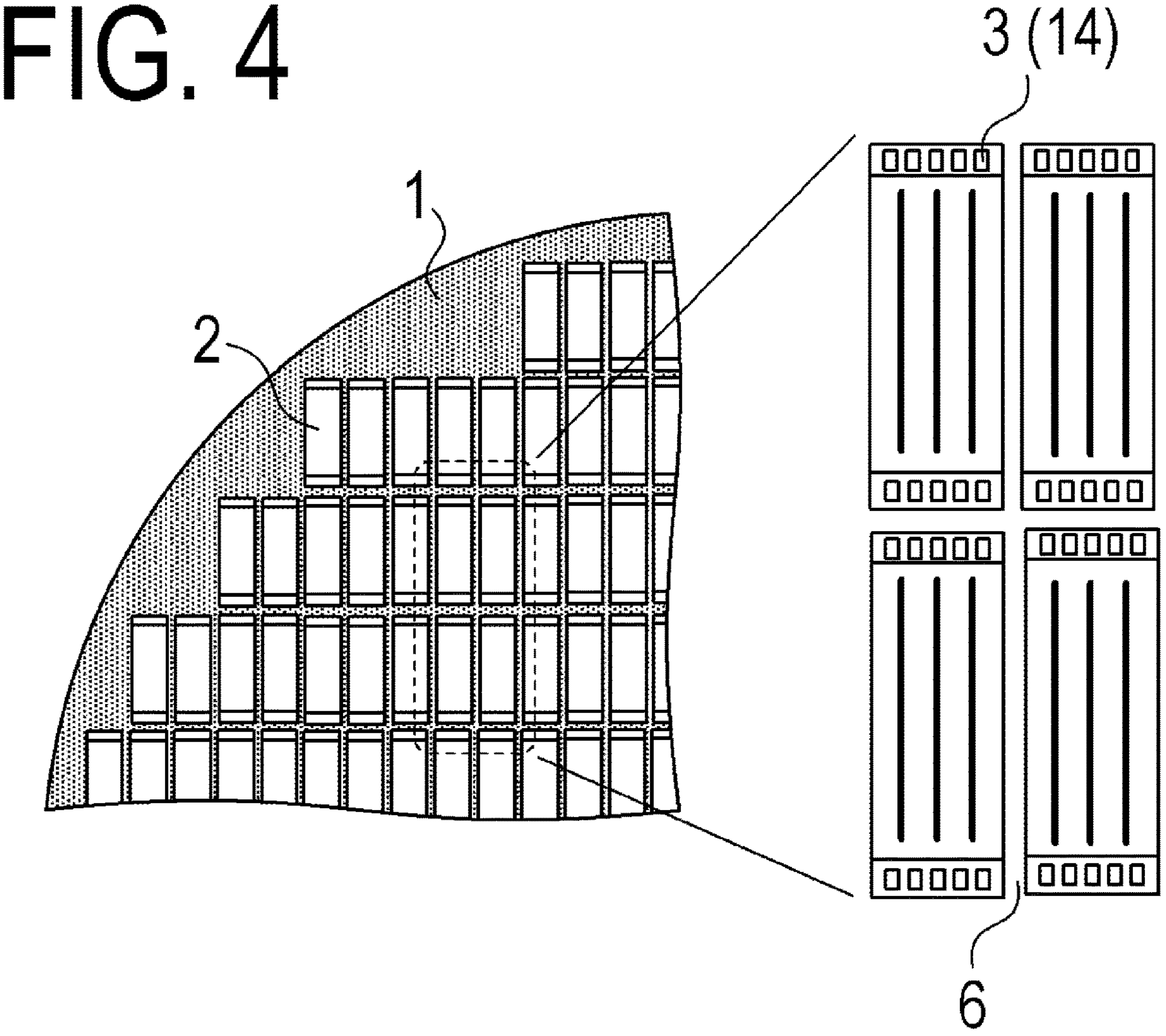
FIG. 4 is a view for explaining a method for producing a liquid ejection head according to Embodiment 1.

A method for producing the liquid ejection head according to Embodiment 1 will be explained next. The element substrate 2 and the wiring substrate 301 are prepared first. For instance, the wiring substrate 301 is produced by bonding the base film 305 and the cover film 306 to each other by way of an adhesive, so as to sandwich the leads 302, and by forming the through-holes 307 by etching or machining. The leads 302 may be fixed to the base film 305 or the cover film 306 using an adhesive, or may be formed under the base film 305 through patterning by photolithography. Further, the element substrate 2 is formed on the silicon wafer 1 illustrated in FIG. 4. The silicon wafer 1 has a large-area disk shape, such that multiple element substrates 2 can be cut out from one silicon wafer 1. The thickness of the silicon wafer 1 is, for instance, 0.725 mm.

Figure 5A:
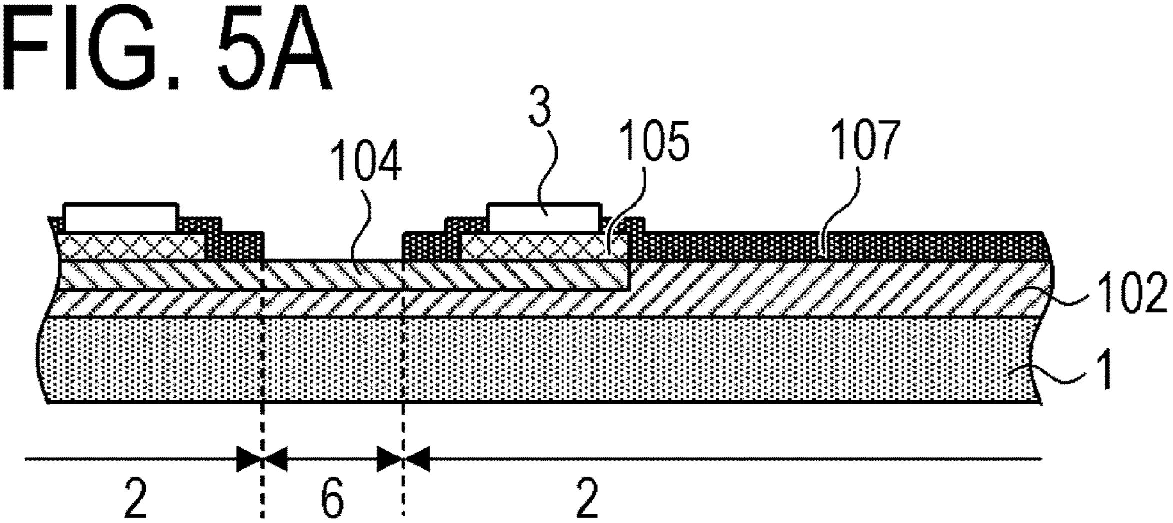
FIGS. 5A and 5B are views for explaining the method for producing the liquid ejection head according to Embodiment 1.

A method for producing the element substrate 2 will be explained next. Firstly, as illustrated in FIG. 5A, an energy generating element 105, heat storage layers 102, 104, a protective layer 107, wiring pads 3 and so forth are formed at a plurality of sites of the silicon wafer 1. The wiring pads 3 are, for instance, wiring pads with plated bumps obtained by forming a gold-plated conductor in accordance with a plating method. Also wiring layers electrically connected to the wiring pads 3 are formed at a plurality of sites of the silicon wafer 1. The energy generating element 105 is, for instance, an electrical heat conversion element (heater layer).

Figure 6A:
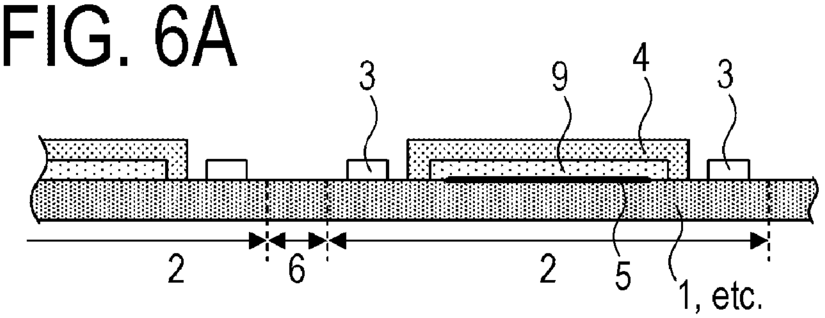
FIGS. 6A to 6D are views for explaining the method for producing the liquid ejection head according to Embodiment 1.

Next, as illustrated in FIG. 6A, a sacrificial layer 5 and a flow channel type material 9 are formed at a plurality of sites of the silicon wafer 1 through patterning by photolithography. The sacrificial layer 5 and the flow channel type material 9 are formed in an overlay portion of, for instance, the silicon wafer 1, the energy generating element 105, the heat storage layers 102, 104, and the protective layer 107. An ejection port forming member 4 is formed (overlaid), so as to cover the flow channel type material 9, through patterning by photolithography.

Figure 6B:
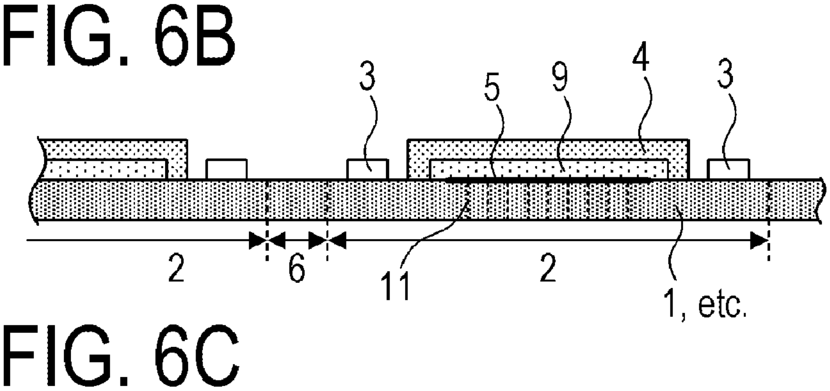

Next, a laser beam (for instance, a YAG fundamental wave) is projected onto the lower face of the silicon wafer 1 (surface on the reverse side from that where the ejection port forming member 4 is formed), to form leading holes 11, as illustrated in FIG. 6B. The leading holes 11 serve as starting points for forming liquid flow channels 8 illustrated in FIG. 6C; for instance, the leading holes 11 are holes having a diameter of 0.05 mm and a depth of 0.7 mm.

Figure 6C:
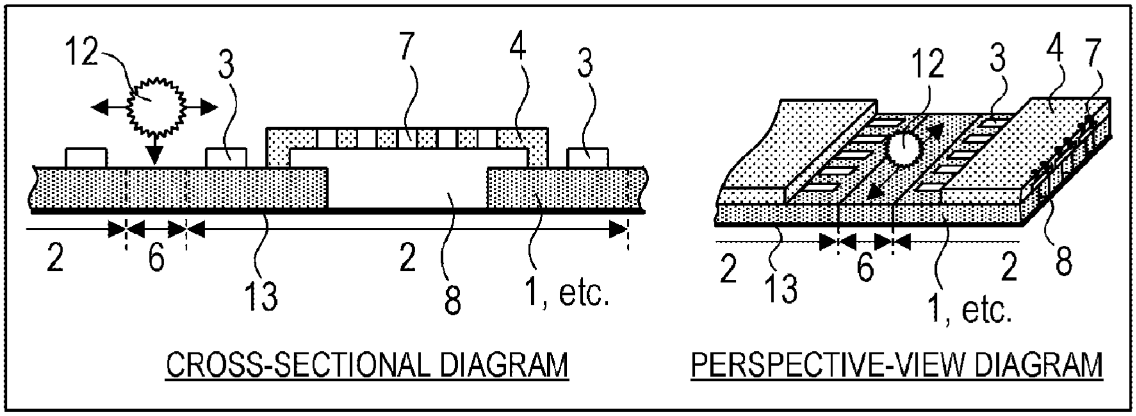

Next, as illustrated in FIG. 6C, the liquid flow channels 8 are formed through removal of a portion where the leading holes 11 are formed, and a pressure chamber that communicates from the liquid flow channels 8 to the plurality of ejection ports 7 is formed through removal of the flow channel type material 9. The silicon wafer 1 is placed in a curing furnace and is heated at 200° C. for 60 minutes, to completely cure the ejection port forming member 4 and so forth. As a result, multiple element substrates 2 having liquid channels and ejection ports are formed on the silicon wafer 1.

Figure 6D:
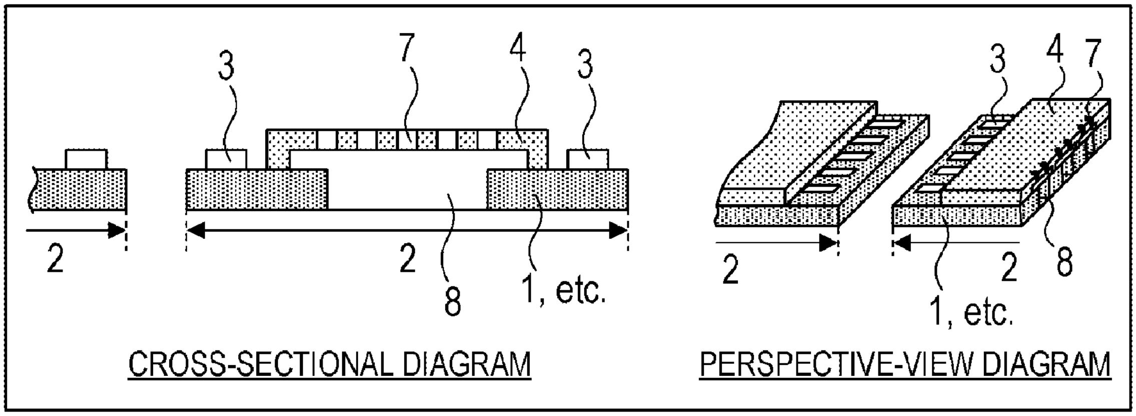

Next, as illustrated in FIG. 6C and FIG. 6D, the silicon wafer (1) is fixed to a dicing tape (13), and the wafer is cut along scribe lines 6 (lines between the element substrates 2), using a dicing device 12. Element substrates 2 are obtained as a result.

Figure 7A:
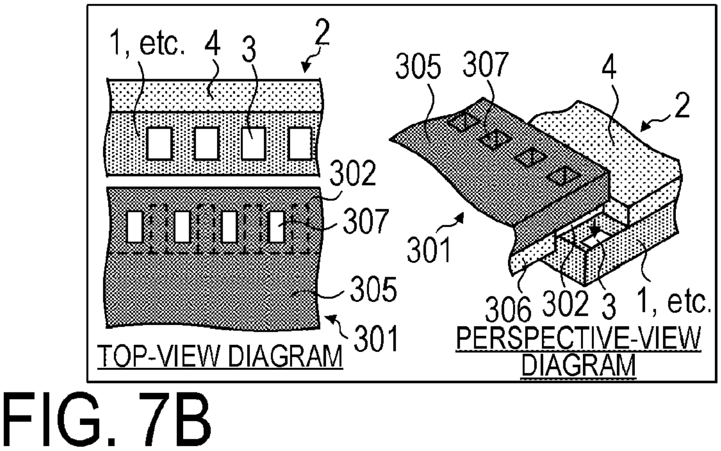
FIGS. 7A to 7D are set of diagrams views for explaining the method for producing the liquid ejection head according to Embodiment 1.
Figure 7B:
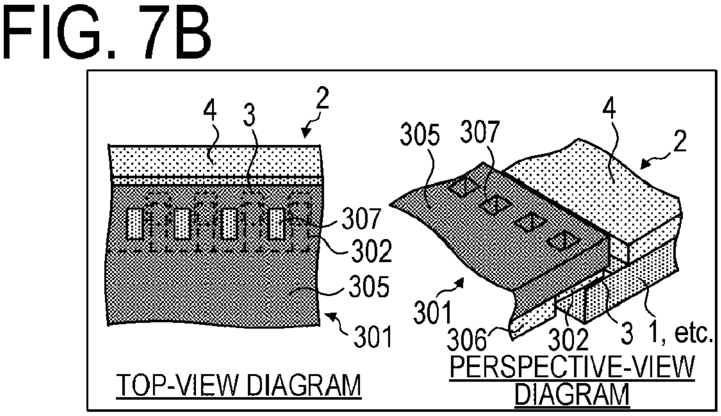

The explanation returns now to a method for producing a liquid ejection head. After preparation of the element substrate 2 and the wiring substrate 301, the wiring substrate 301 is connected to the element substrate 2 as illustrated in FIG. 7A and FIG. 7B. Specifically, the leads 302 exposed under the base film 305 of the wiring substrate 301 are connected to the wiring pads 3 of the element substrate 2. The connection method may be a method for joining the leads 302 and the wiring pads 3 using heat, pressure, ultrasounds or the like, or may be a method for electrically connecting the leads 302 and the wiring pads 3 by way of an auxiliary connecting material.

Figure 7C:
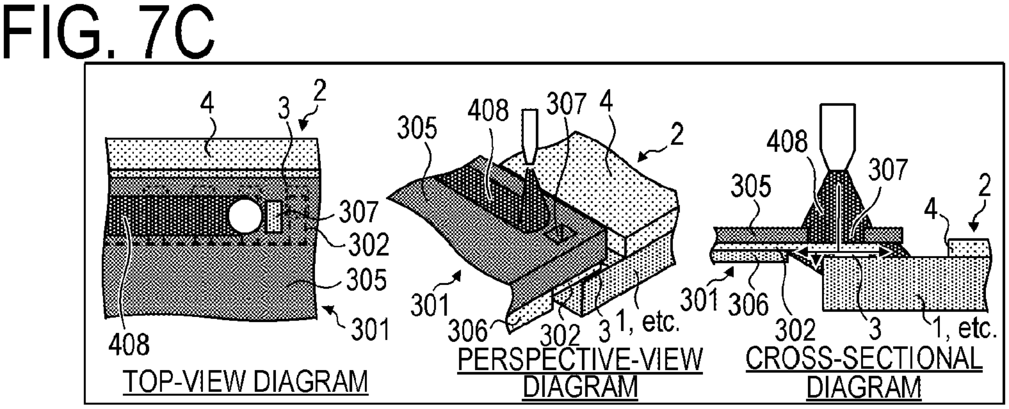

Next, as illustrated in FIG. 7C, a sealant 408 (for instance, a thermosetting epoxy resin) is applied to the connection portions, so that the connection portions of the element substrate 2 and the wiring substrate 301 are sealed. The sealant 408 is injected via the through-holes 307. The sealant 408 injected via the through-holes 307 flows in the direction of the arrows illustrated in the cross-sectional view of FIG. 7C (i.e., along the bottom of the base film 305), and seals the connection portions of the element substrate 2 and the wiring substrate 301.

Figure 7D:
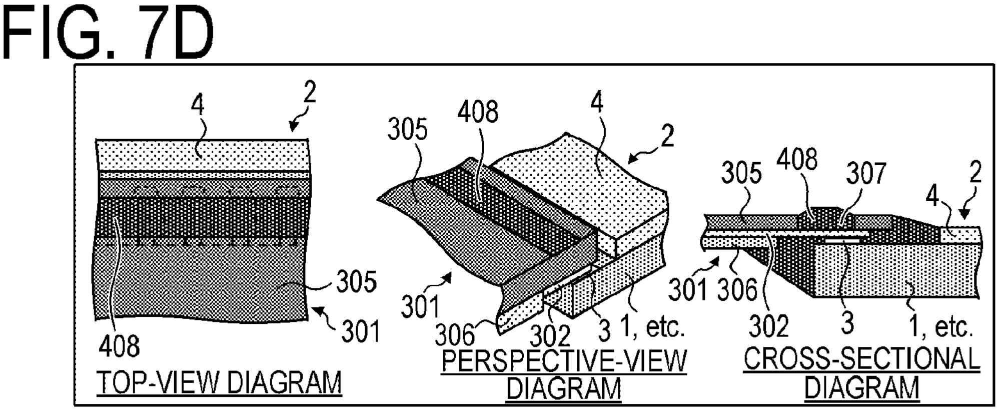

Next, the structure after application of the sealant 408 is heated for 5 minutes or longer in a curing furnace heated to 150° C., thereby completely curing the sealant 408. FIG. 7D illustrates the cured structure of the sealant 408.

Figure 8A:
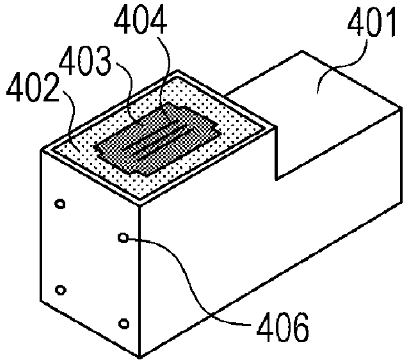
FIGS. 8A to 8F are views for explaining the method for producing the liquid ejection head according to Embodiment 1.

Production of the housing 401, which is a liquid supply member, is separate from the connection of the element substrate 2 and the wiring substrate 301. The housing 401 is formed, for instance, by insert molding using a molding mold. Resins such as modified PPE (polyphenylene ether), PS (polystyrene), HIPS (impact-resistant polystyrene), and PET (polyethylene terephthalate) can be used as the material of the housing 401. As illustrated in FIG. 8A, liquid supply channels 404 that communicate with the liquid flow channels 8 of the element substrate 2 are formed in an element substrate mounting portion 403, of the housing 401, in which the element substrate 2 is provided.

Figure 8B:
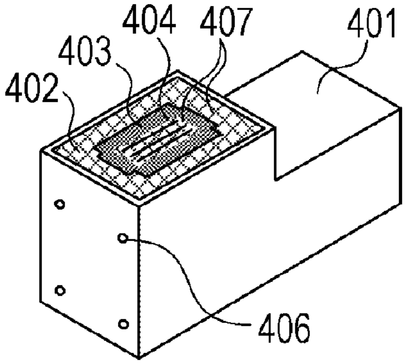

Next, as illustrated in FIG. 8B, an adhesive 407 is applied to the element substrate mounting portion 403 and a wiring substrate affixing portion 402 of the housing 401. The adhesive 407 is applied to the element substrate mounting portion 403 so as to surround the liquid supply channels 404.

Figure 8C:
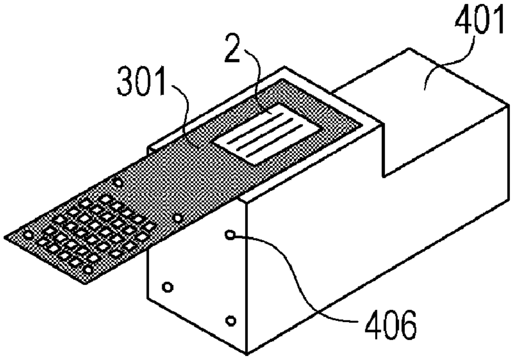

Next, as illustrated in FIG. 8C, the element substrate 2 and the wiring substrate 301 are affixed to the housing 401 via the adhesive 407. Specifically, the element substrate 2 is superimposed on the element substrate mounting portion 403, and the element substrate 2 and the wiring substrate 301 are pressed toward the housing 401. With the element substrate 2 and the wiring substrate 301 thus affixed to the housing 401, the affixing portion is temporarily fixed, for instance, through irradiation with ultraviolet rays, or through heating of a jig that grips (suction-holds) the element substrate 2. The structure thus temporarily fixed is then heated for 1.5 hours or longer in a curing furnace heated to 105° C., thereby completely curing the adhesive 407.

Figure 8D:
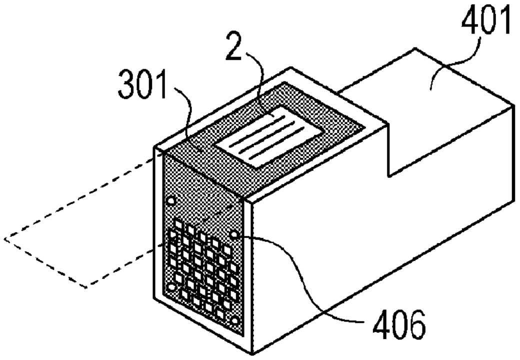

Next, as illustrated in FIG. 8D, a contact pad portion of the wiring substrate 301 (portion on the side of the contact pads 304) is bent along the housing 401. Protruding crimping pins 406 provided in the housing 401 are fitted into holes provided in the wiring substrate 301. The crimping pins 406 are thereafter squashed using a horn heated to 200° C. and are thermocompression bonded to the wiring substrate 301, to fix the contact pad portions of the wiring substrate 301 to the housing 401.

Figure 8E:
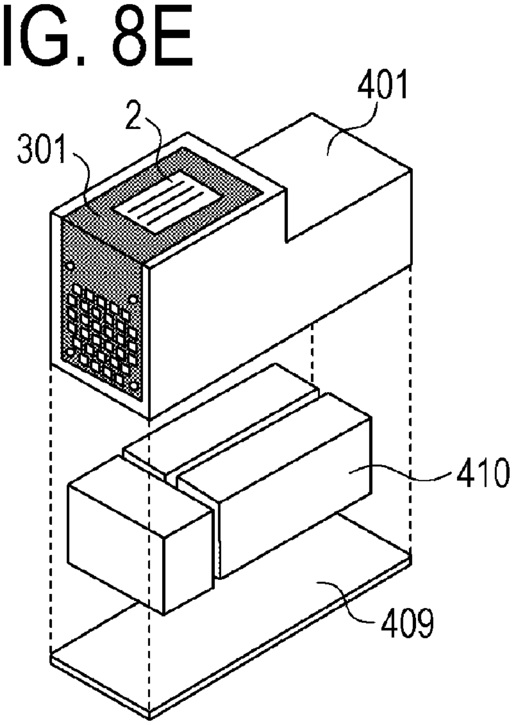
Figure 8F:
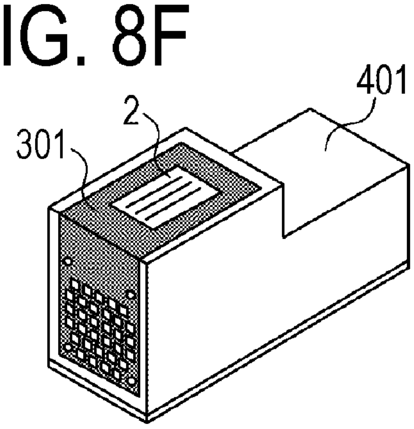

Next, as illustrated in FIG. 8E, absorbers 410 that absorb a liquid such as ink are inserted into the housing 401, and a desired liquid is injected. A lid 409 is then attached to the housing 401, and the lid 409 side of the housing 401 is completely sealed. For instance, frictional heat is generated between the lid 409 and the housing 401 by lateral vibration welding, to thereby weld the lid 409 to the housing 401. This completes a liquid ejection head such as that illustrated in in FIG. 8F.

Embodiment 2

Figure 3B:
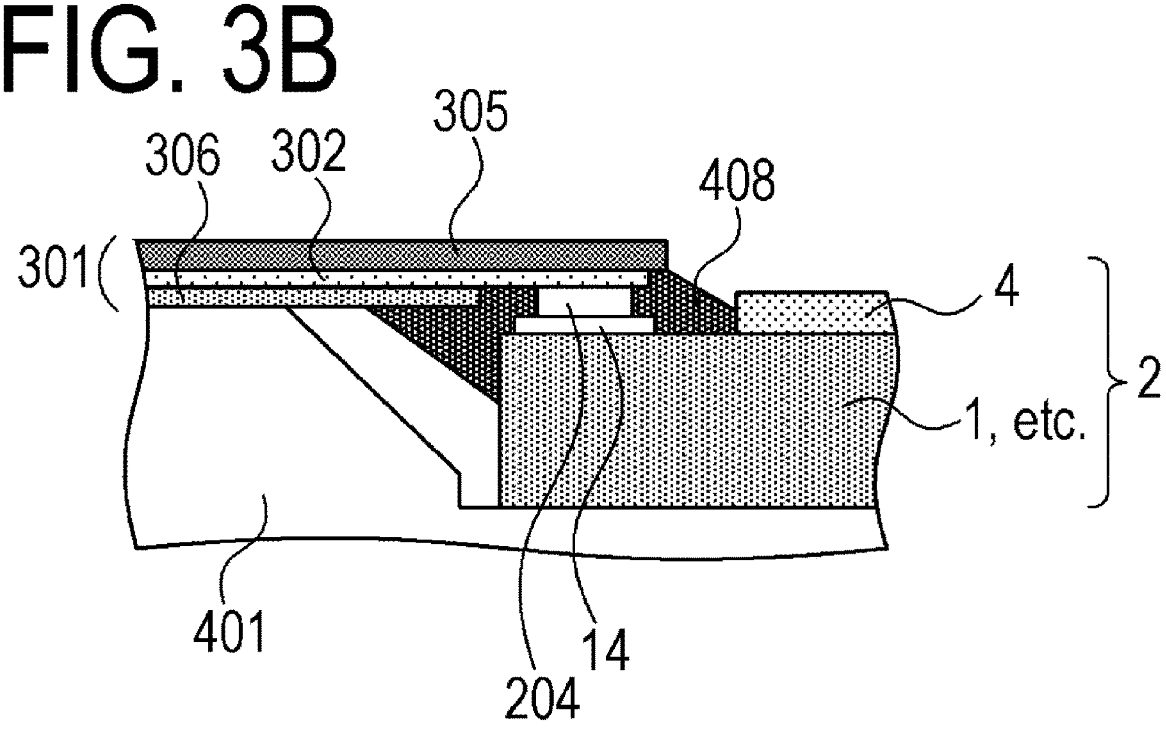
Figure 5B:
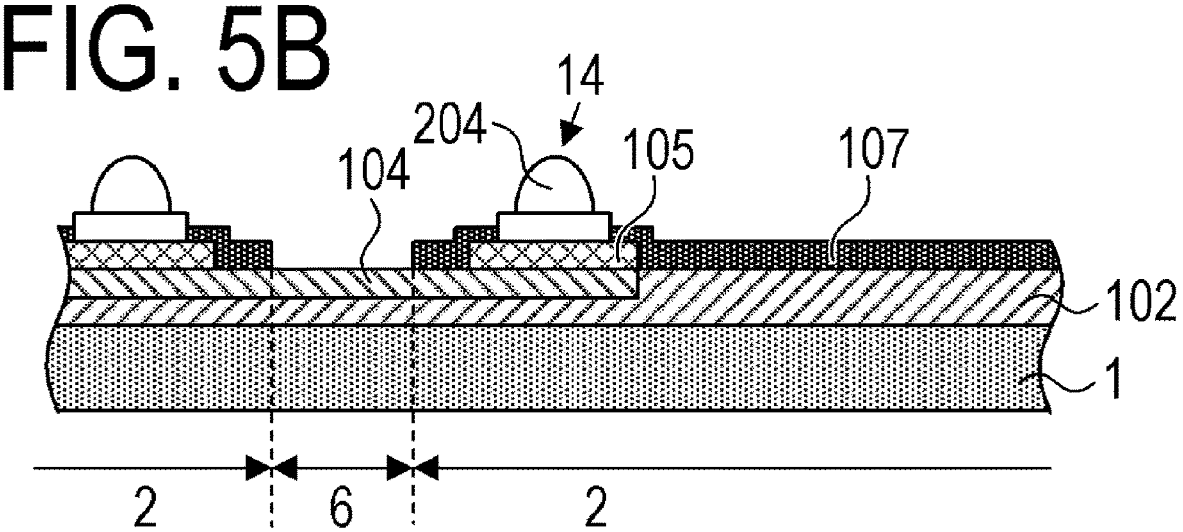

Embodiment 2 of the present invention will be explained next. An explanation of portions identical to those of Embodiment 1 will be omitted herein. In the second embodiment, wiring pads 14 on which stud bumps 204 are formed are used instead of wiring pads 3 with plated bumps, as the wiring pads of the element substrate 2, as illustrated in FIG. 3B and FIG. 5B.

Figure 9A:
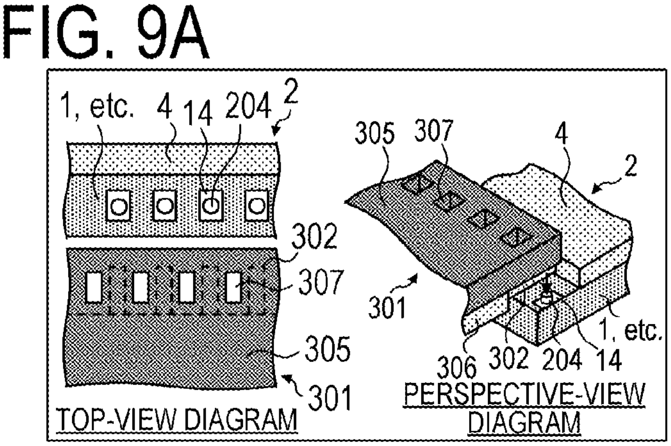
FIGS. 9A to 9D are views for explaining a method for producing a liquid ejection head according to Embodiment 2.
Figure 9B:
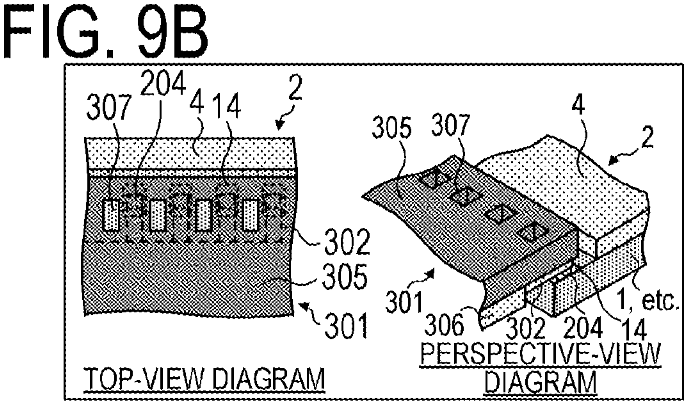

The explanation returns now to the method for producing the liquid ejection head. Once the element substrate 2 is obtained in accordance with the same production method as in Embodiment 1, the wiring substrate 301 is then connected to the element substrate 2 as illustrated in FIG. 9A and FIG. 9B. Specifically, the leads 302 exposed under the base film 305 of the wiring substrate 301 are connected to the wiring pads 14 of the element substrate 2. The connection method may be a method for joining the leads 302 and the wiring pads 14, for instance, relying on heat, pressure or ultrasound.

Figure 9C:
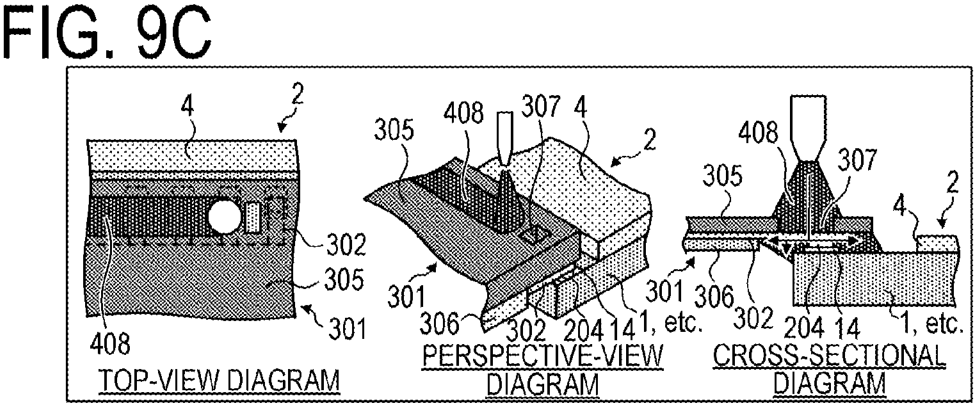

Next, as illustrated in FIG. 9C, a sealant 408 (for instance, a thermosetting epoxy resin) is applied to the connection portions, so that the connection portions of the element substrate 2 and the wiring substrate 301 are sealed. The sealant 408 is injected via the through-holes 307. The sealant 408 injected via the through-holes 307 flows in the direction of the arrows illustrated in the cross-sectional view of FIG. 9C (i.e., along the bottom of the base film 305), and seals the connection portions of the element substrate 2 and the wiring substrate 301.

Figure 9D:
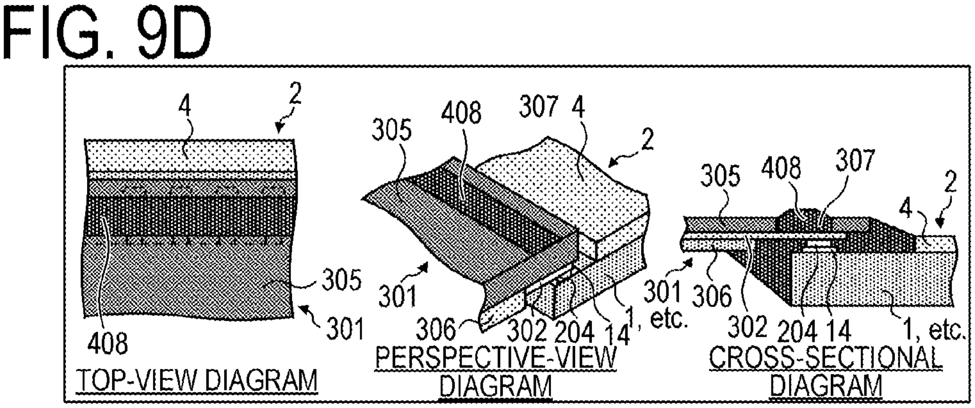

Next, the sealant 408 is completely cured through heating of the structure resulting from application of the sealant 408, in a curing furnace heated to 150° C., for 5 minutes or longer. FIG. 9D illustrates the cured structure of the sealant 408. Subsequent steps are identical to those in Embodiment 1 (FIG. 8A to FIG. 8E).

OTHER EMBODIMENTS

Figure 10A:
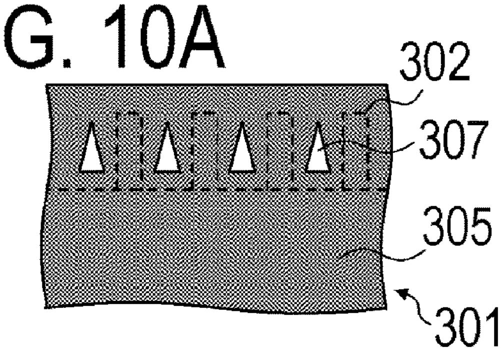
FIGS. 10A to 10F are views illustrating a variation of a wiring substrate.
Figure 10B:
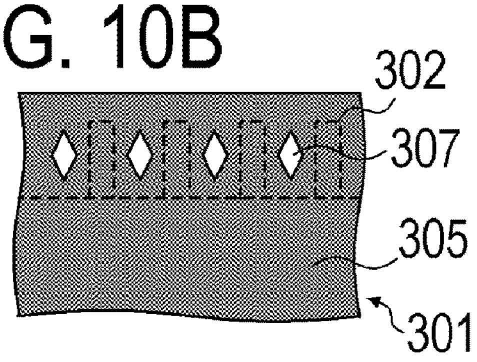
Figure 10C:
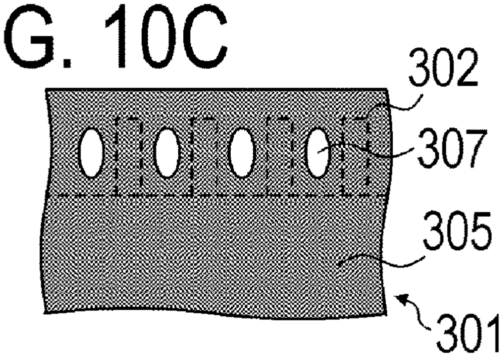
Figure 10D:
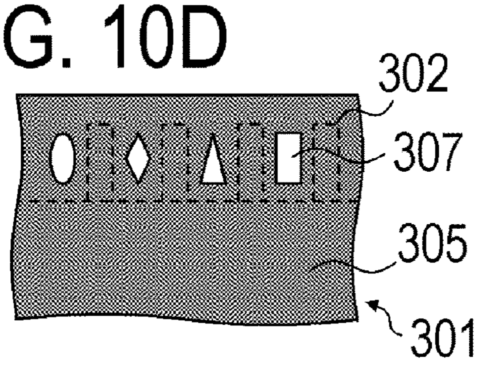
Figure 10E:
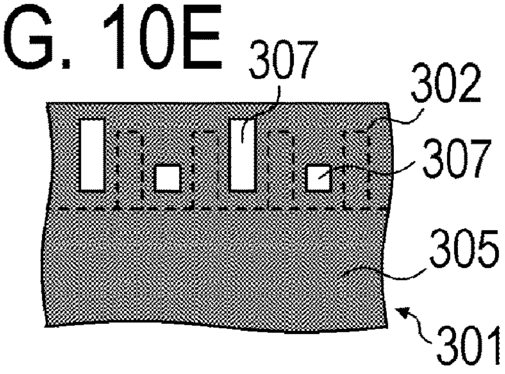
Figure 10F:
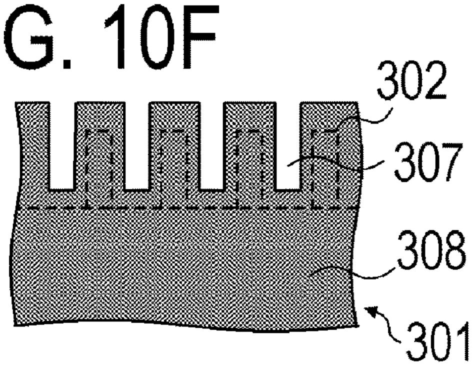

An example in which rectangular through-holes 307 are formed has been described in Embodiment 1, but the present invention is not limited thereto. Other examples are illustrated in FIG. 10A to FIG. 10F. For instance, through-holes 307 of another polygonal shape, for example, triangular, may be formed herein, as illustrated in FIG. 10A. Diamond-shaped through-holes 307 may likewise be formed, as illustrated in FIG. 10B. A meniscus of the sealant 408 is prone to form at acute-angled portions of a triangle or rhombus, which may hamper the flow of the sealant 408 towards corners. Rounded (circular) through-holes 307 may be formed, as illustrated in FIG. 10C. The through-holes 307 may have a perfect circular shape, or an elliptical shape. As illustrated in FIG. 10D and FIG. 10E, there may be formed multiple through-holes 307 having dissimilar shapes. In FIG. 10D there are formed a round through-hole 307, a diamond-shaped through-hole 307, a triangular through-hole 307 and a rectangular through-hole 307. In FIG. 10E there are formed rectangular through-holes 307 and square through-holes 307. For instance, the through-holes 307 are made smaller in portions at which the sealant 408 is to be locally applied, and larger in portions at which the sealant 408 is to be sealed over a wide area. Slits 308 may be formed instead of the through-holes 307, as illustrated in FIG. 10F, in a case, for instance, where the sealant 408 is raised on the element substrate 2 side. The through-holes 307 and slits 308 may be mixed with each other. The number and shape of the through-holes 307 and the number and shape of the slits 308 are not particularly limited, so long as the leads 302 are not exposed (are covered with the base film 305).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-168778, filed on Oct. 14, 2021, which is hereby incorporated by reference herein in its entirety.

What is claimed is:

1. A liquid ejection head, comprising:
an element substrate in which a liquid ejection port is formed, the element substrate having an energy generating element that generates energy for ejecting the liquid from the liquid ejection port, and a plurality of wiring pads aligned in a predetermined direction;
a flexible wiring substrate having a plurality of leads aligned in the predetermined direction and overlaid on and connected to, respectively, the plurality of wiring pads, and a base film overlaid on the plurality of leads at a side opposite to that of the plurality of wiring pads; and
a sealant that seals a plurality of connection portions of the plurality of wiring pads and the plurality of leads,
wherein the base film has:
a plurality of covering portions that respectively cover the plurality of leads at a side opposite to that of the plurality of connection portions; and
an opening or slit formed between the plurality of covering portions.

2. The liquid ejection head according to claim 1,
wherein a size of the opening or of the slit in the predetermined direction is shorter than a spacing between the plurality of wiring pads.

3. The liquid ejection head according to claim 1,
wherein the base film has the opening formed between the plurality of covering portions.

4. The liquid ejection head according to claim 3, wherein the base film has the opening, which is polygonal or round, and formed between the plurality of covering portions.

5. The liquid ejection head according to claim 4,
wherein the base film has the opening, which is triangular, rhomboidal or rectangular, and formed between the plurality of covering portions.

6. The liquid ejection head according to claim 1, wherein the base film has the slit formed between the plurality of covering portions.

7. The liquid ejection head according to claim 1, wherein as viewed in a direction perpendicular to a surface of the element substrate, the opening or the slit does not overlap any of the leads.

8. The liquid ejection head according to claim 1, wherein as viewed in a direction perpendicular to a surface of the element substrate, the plurality of leads is not exposed through the base film.

9. The liquid ejection head according to claim 1, wherein a plurality of openings or slits is provided corresponding to one row of the plurality of wiring pads arranged in the predetermined direction.

10. A method for producing a liquid ejection head, the method comprising the steps of:

preparing an element substrate in which a liquid ejection port is formed, the element substrate having an energy generating element that generates energy for ejecting the liquid from the liquid ejection port, and a plurality of wiring pads aligned in a predetermined direction;

preparing a flexible wiring substrate having a plurality of leads aligned in the predetermined direction and overlaid on and connected to, respectively, the plurality of wiring pads, and a base film overlaid on the plurality of leads at a side opposite to that of the plurality of wiring pads;

respectively connecting the plurality of leads to the plurality of wiring pads; and sealing, by a sealant, a plurality of connection portions of the plurality of wiring pads and the plurality of leads, wherein the base film has:

a plurality of covering portions that respectively cover the plurality of leads at a side opposite to that of the plurality of connection portions; and an opening or slit formed between the plurality of covering portions.

11. The method for producing a liquid ejection head according to claim 10, wherein a size of the opening or of the slit in the predetermined direction is shorter than a spacing between the plurality of wiring pads.

12. The method for producing a liquid ejection head according to claim 10, wherein the base film has the opening formed between the plurality of covering portions.

13. The method for producing a liquid ejection head according to claim 12, wherein the base film has the opening, which is polygonal or round, and formed between the plurality of covering portions.

14. The method for producing a liquid ejection head according to claim 13, wherein the base film has the opening, which is triangular, rhomboidal or rectangular, and formed between the plurality of covering portions.

15. The method for producing a liquid ejection head according to claim 10, wherein the base film has the slit formed between the plurality of covering portions.

16. The method for producing a liquid ejection head according to claim 10, wherein the sealant is injected via the opening or the slit to the plurality of connection portions.

* * * * *